United States Patent [19]

Jabsen

[11] 4,155,808

[45] May 22, 1979

[54] NUCLEAR FUEL ROD INSPECTION STRUCTURE

[75] Inventor: Felix S. Jabsen, Lynchburg, Va.

[73] Assignee: The Babcock & Wilcox Company, New York, N.Y.

[21] Appl. No.: 742,148

[22] Filed: Nov. 15, 1976

[51] Int. Cl.² .............................................. G21C 3/30
[52] U.S. Cl. .................................. 176/78; 176/93 BP
[58] Field of Search .................. 176/78, 86 R, 93 BP

[56] References Cited

U.S. PATENT DOCUMENTS

| 3,361,639 | 1/1968 | Ashcroft | 176/86 R |
|---|---|---|---|
| 3,510,398 | 5/1970 | Wood | 176/86 R |
| 3,741,868 | 6/1973 | Qurnell | 176/86 R |
| 3,770,583 | 11/1973 | Klumb | 176/78 |
| 3,862,884 | 1/1975 | Jabsen | 176/78 |

Primary Examiner—Verlin R. Pendegrass
Assistant Examiner—Donald P. Walsh
Attorney, Agent, or Firm—J. M. Maguire; J. P. Sinnott

[57] ABSTRACT

A typical embodiment of the invention provides a fitting for stabilizing the burnable poison rods and the like within a nuclear reactor fuel element. An illustrative orifice rod assembly fitting is assembled inexpensively from stamped metal strips which expose the ends of the fuel rods within the fuel element for inspection and simplify rearrangement of partially used fuel elements within a reactor core.

3 Claims, 3 Drawing Figures

NUCLEAR FUEL ROD INSPECTION STRUCTURE

BACKGROUND OF THE INVENTION

1. Field of the Invention

This invention relates to fittings for nuclear reactor fuel elements and, more particularly, to orifice rod assemblies that expose the ends of the fuel rods for inspection, and the like.

2. Description of the Prior Art

Nuclear reactors generally have a core that generates heat as a result of the fission processes which occur in a critical concentration of uranium within that core. Usually, in power reactor systems, this critical concentration of uranium is assembled by loading pellets or uranium dioxide into hollow tubes, or fuel rods. These loaded fuel rods are then grouped into relatively rigid sub-assemblies, or fuel elements, which are placed together within the reactor pressure vessel in order to form the reactor core.

In addition to the array of fuel rods, these fuel elements also have in many cases a number of other rods, of which control rods and "burnable poison" rods are typical. Usually, these control and "burnable poison" rods are distributed throughout respective fuel rod bundles in order to control the level of fission process activity and hence, the power output from the reactor core as well as to increase the useful life of the reactor core.

As a general matter, the control rods each are received within respective guide tubes, the group of rods for a particular fuel element being joined together at one end by means of a casting that is referred to as a "spider." This configuration gangs together all of the control rods in one fuel element to enable these rods to move as a single group in a direction that is parallel to the longitudinal axes of the fuel rods. The range of this ganged control rod movement, moreover, extends during reactor operation from fully inserted into the fuel element to fully withdrawn from the fuel element.

In contrast to these control rods, the "burnable poison" rods do not move relative to the fuel rods while the fuel element is in place within the reactor core. In a manner that is similar, however, to the control rods the "burnable poison" rods in a particular fuel element are joined together at one end by means of a cast metal "spider," or orifice rod assembly.

As the fissionable material within the fuel elements that comprise the reactor core is consumed, to obtain maximum core life it frequently is advisable from time-to-time to shift the relative locations of the individual fuel elements within the core. In these circumstances, it often is preferable to relocate fuel elements that accommodate control rods at a new position within the core in which the fuel element should not house control rods, but "burnable poison" rods instead or, perhaps, no rods at all. Similarly, fuel elements without control or "burnable poison" rods now might be ideally relocated in places in which one of these two rod types should be housed within the element. Naturally, fuel elements with "burnable poison" rods also might be subject to repositioning at a station in which control rods, or no rods of either type would be more suitable.

Because these three types of fuel elements require different fittings, relocation of partially used fuel elements is conducted on a less than optimum repositioning schedule to avoid the need to modify the now radioactive fuel elements to accomodate the particular configuration of control rod, "burnable poison" rod (or neither of these two rods) that characterizes the new fuel element section. On the other hand, if optimum repositioning is desired, necessary modifications to the fuel elements must be carried out in a cumbersome and expensive manner with remote handling equipment. Further in this respect, the empty control rod guide tubes in those fuel elements that do not have either control rods or "burnable poison" rods present special thermal problems. Typically, to remove heat from the reactor core, the void spaces within the core are filled with flowing, pressurized water. In this situation the empty guide tubes in these fuel elements tend to channel relatively cold water from the inlet to the reactor core through to the core coolant outlet. This colder water mixes with the hot water that is discharging from the core and thereby produces an undesirable decrease in the average temperature of the coolant that flows from the core.

Under the conditions of pressure, heat, radiation and high velocity water flow, the structural integrity of the individual fuel rods as well as the fuel elements into which they are grouped also is of fundamental importance. Accordingly, to retain the fuel rods within their relative positions in the respective fuel elements, sturdy cast metal "end fittings" are used to engage both of the ends of each of these fuel rods and the control rod guide tubes as well as at least one end of the "burnable poison" rods in those fuel elements which have this type rod.

The lower end of the entire group of fuel elements that constitute the reactor core usually is supported on a grid-like structure, or lower grid plate, that sustains the weight of the fuel elements against the force of gravity. This lower grid plate also distributes the pressurized coolant that flows into the reactor core in a manner that insures, insofar as it is possible, that there is a generally uniform temperature distribution within the core and that "hot spots" in the reactor core are largely eliminated.

Because the coolant flows upwardly during reactor operation at a substantial pressure and flow velocity, there is a tendency for the hydraulic forces to lift the fuel elements from the lower grid plate. To counter this effect the reactor also is provided with a grill-like upper grid plate. In this instance portions of the upper end fitting bear directly against metal pads that protrude downwardly from this upper grid plate, thereby engaging the fuel elements and retaining them in proper respective position against these hydraulic forces and the spring-loaded upper end fitting.

As a matter of sound engineering practice, moreover, it is customary to inspect each fuel rod at generally regular intervals during the operational lifetime of the reactor core. After reactor operation has commenced, the fuel rods become radioactive and hence these routine inspections necessarily must be conducted with remote handling equipment in suitably shielded conditions. To carry out these inspections, it has been the practice to shut down the reactor and withdraw from the core the fuel elements that contain the fuel rods which are to be examined. These fuel elements are subsequently dismantled and the fuel rods are inspected individually in a "sipping" can in which a radiation detector checks the radioactivity of a test fluid that flows from the can in order to identify a notably high level of radioactivity which is indicative of a ruptured, defective rod.

This rather tedious procedure of remote disassembly, inspection and reassmbly is required for a number of reasons, not the least of which is the presence of the massive cast metal "spider" for the control rods or the "burnable poison" rods, depending on the nature of the particular fuel element These monolithic castings block direct observation and alignment between the individual fuel rod ends and a collimated radiation detector, thereby preventing the detector from identifying specific defective fuel rods. Further in this respect, the cast control and "burnable poison" rod "spiders" are quite expensive. These "spider" fittings also require very careful inspection to guard against flaws and those other defects that are frequently encountered in complicated cast shapes which must operate in hostile environments.

In these circumstances there is a need for a less expensive but equally durable control and "burnable poison" rod "spider" that will not obstruct fuel rod inspection, but will expose the individual rods for examination without imposing a need to dismantle the entire fuel assembly. There is, of course, a further need for a more flexible control and "burnable poison" rod assembly that will permit optimum fuel element relocation with the reactor core without requiring specific modifications or producing undesirable thermal effects.

SUMMARY

These and other difficulties that result from the use of monolithic cast control rod and "burnable poison" rod spiders which have characterized the prior art are overcome, to a large extent, through the practice of the invention. More specifically, in accordance with a salient feature of the invention an open lattice of interlocking plates is provided to support an array of control rod guide tubes or "burnable poison" rods. This lattice forms an open cellular structure that not only exposes the fuel rod ends to simplify routine fuel rod integrity inspections but also is a less expensive structure that matches the strength of the prior art monolithic cast "spiders." This cellular grid construction, moreover, avoids the more difficult quality assurance problems that usually are involved in the manufacture of cast metal products and especially those products that have complicated shapes.

Perhaps most important however, is the flexibility that the instant invention affords in partially used fuel element relocation within a reactor core. The illustrative grid structure provides interchangeability between control rod, "burnable poison" rod and open guide tube types of fuel element without imposing a need for structural modification to the fuel element. With respect to the thermal problems, moreover, that have characterized the open control rod guide tube type of fuel element, plugs to close these guide tube flow channels are incorporated into the grid structure of the orifice rod assembly. In this manner, the bypassed flow through these guide tubes that has tended, in the prior art, to degrade the temperature of the coolant flowing from the reactor core is stopped.

Accordingly, the invention not only provides greater flexibility, economy and efficiency in extending the commercially useful life of nuclear reactor cores in an inexpensive and reliable manner, but also overcomes a thermal inefficiency that has been troublesome in the past.

The various features of novelty which characterize the invention are pointed out with particularity in the claims annexed to and forming a part of this specification. For better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 3:
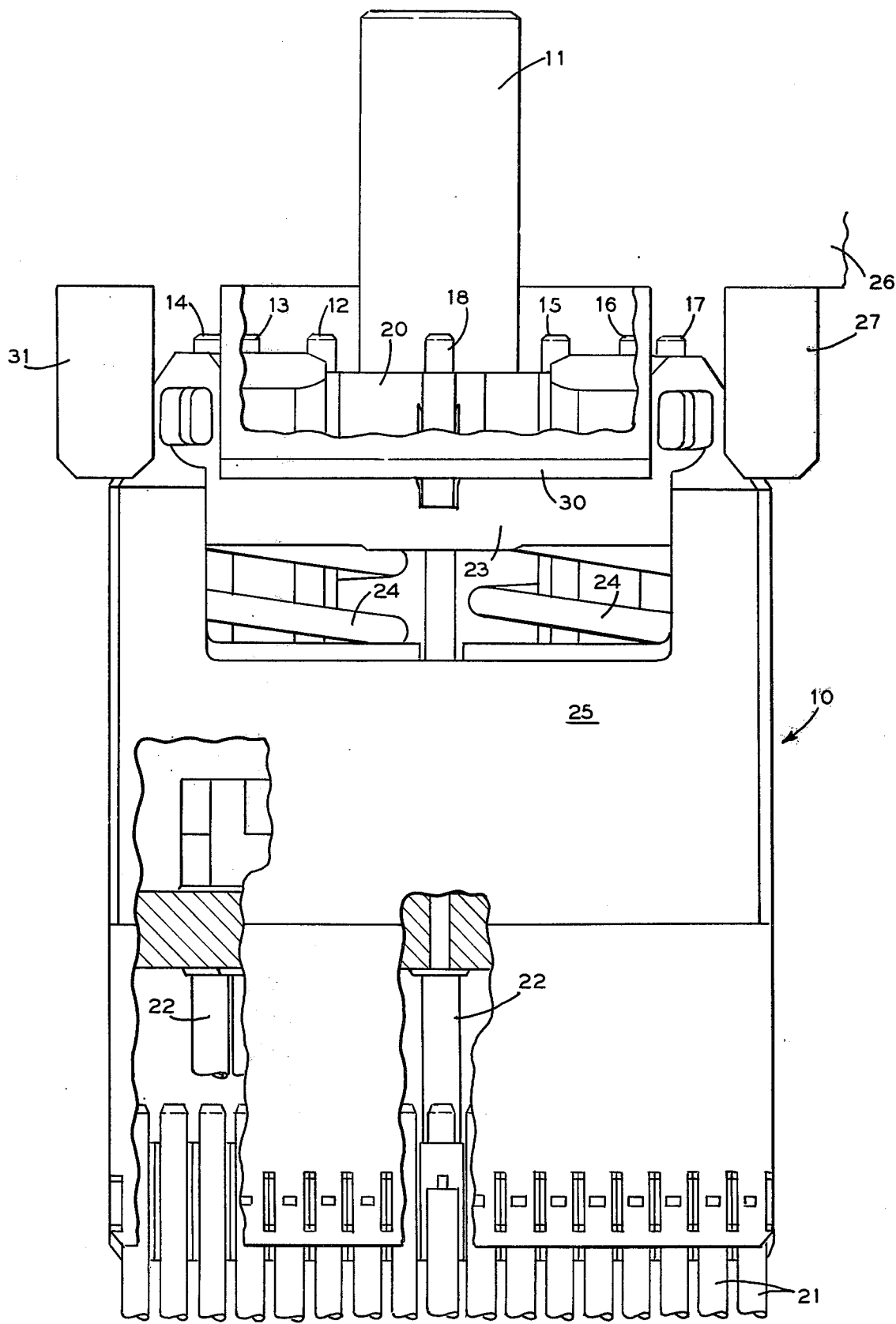
FIG. 3 is a side elevation of a portion of a fuel element with an assembly that is similar to the one which is shown in FIGS. 1 and 2, lodged within a reactor core.

For a more complete appreciation of the invention, attention is invited to FIG. 3 which shows a portion of a typical fuel element 10. The fuel element has a stud 11 to which control rods 12 through 18 are ganged by means of a cellular sheet metal orifice rod assembly 20, that characterizes the invention. It will be recalled in this respect that all of the control rods 12 thorugh 18, as well as those control rods in the fuel element 10 that are out of the plane of the FIG. 3 drawing are received within guide tubes 22 that ensheath the control rods, while the control rods within the tubes 22 are free to move into or out of the fuel element 10 in directions that are parallel to the longitudinal axes of fuel rods 21 as a unit in response to the motion of the stud 11 that is initiated by means of a control drive mechanism (not shown in the drawing).

Thus, although not shown in FIG. 3 of the drawing, the stud 11 is welded, or otherwise suitably fastened to the cellular framework that comprises the orifice rod assembly 20. The ends of the control rods 12 through 18, inclusive, also are rigidly engaged in respective cells in the assembly as described subsequently in more complete detail. In these circumstances, the motion of the stud 11 in directions parallel to the longitudinal axes of the fuel rods 21 necessarily compels the control rods 12 through 18 to undergo the same motion in order to regulate the power level of the reactor core.

As shown in FIG. 3, the orifice rod assembly 20, when the control rods 12 through 18 are fully inserted into the guide tubes 22 in the fuel element 10, rests upon a plate 23 which is sustained by means of an array of coil springs 24. In this manner, the plate 23 is capable of movement in the same direction as the control rod stud 11, the movement distance for the plate being limited only by the compression characteristics of the coil springs 24 and a set of stops (not shown in the drawing). These stops protrude from the corners of the upper end fitting 25 inwardly toward the orifice rod assembly 20 over a sufficient portion of the top surface of the plate 23 to retain the plate within the upper end fitting 25.

In the reactor core, the fuel element 10 is kept in its proper relative position through a transversely disposed upper grid plate 26 which extends across the top of the reactor core (not shown in the drawing). A group of upper grid pads 27, 30 and 31 are secured to and protrude below the upper grid plate 26. The pads 27, 30, 31 (and a fourth pad that is not shown in the figure of the drawing) all bear against the flat upper surface of the plate 23. In this manner, the fuel element 10 is retained in its proper relative position in a resilient manner, the upper grid plate 26 bearing, in effect, against the coil springs 24. The control rods 12 through 18, inclusive, the orifice rod assembly to which they are attached, and the stud 11 that activates the control rod movement, moreover, all are free to enjoy the joint longitudinal movement that has been described above.

Figure 1:
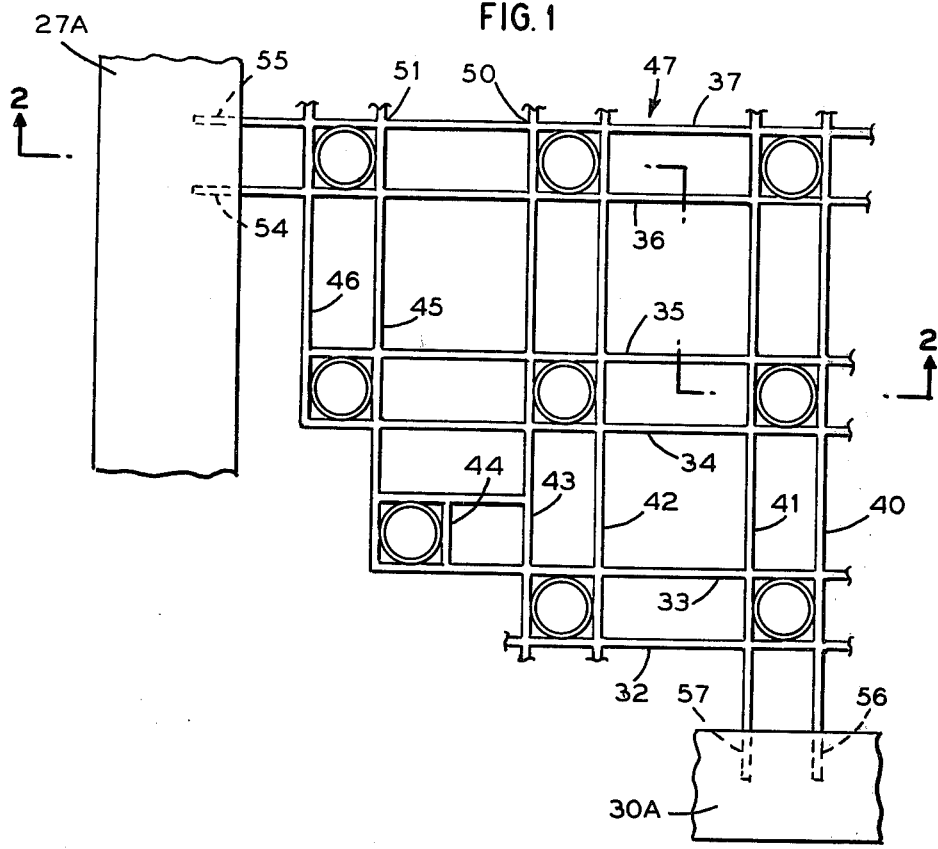
FIG. 1 is a plan view of a portion of a typical orifice rod assembly illustrating features of the invention.
Figure 2:
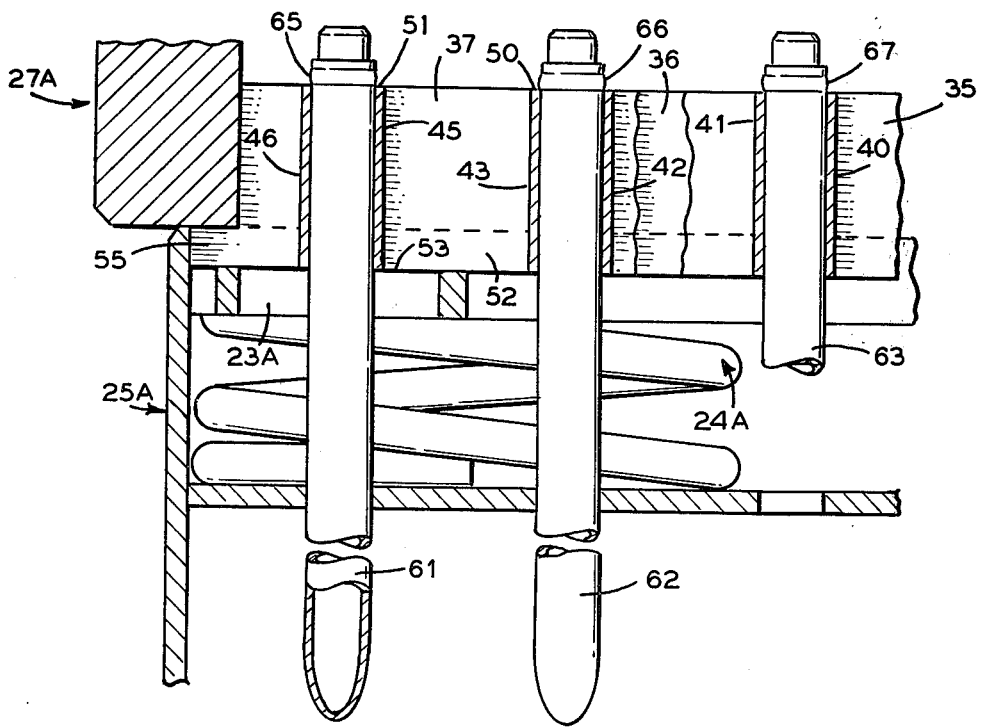
FIG. 2 is a front elevation of a portion of the assembly that is shown in FIG. 1, taken along the line 2—2 of FIG. 1 in partial broken section, viewed in the direction of the arrows.

For a more complete understanding of the cellular structure that characterizes the orifice rod assembly, attention is invited to FIG. 1 of the drawing. In FIG. 1 (and in companion view FIG. 2) the orifice rod assembly has a provision to stop reactor coolant flow through empty control rod guide tubes for the reasons hereinbefore considered. The structure that characterizes FIGS. 1 and 2, moreover, does not accommodate a group of stationary "burnable poison" rods, or the moveable control rods that were described in specific detail with respect to FIG. 1. Before undertaking a more complete description of the invention as it is illustrated in FIGS. 1 and 2 it is also important to note that the fuel element 10 shown in FIG. 3 is a "17×17" array, that is, an assembly that accommodates 205 fuel rods and a specific companion set of "burnable poison", empty guide tubes or guide tubes and control rods, as the case may be. The structure shown in FIGS. 1 and 2, however, is applied to a "17×17" array, which sustains a combination of 289 fuel rods in appropriate combination with "burnable poison" rods, empty guide tubes or guide tubes and control rods. Necessarily, these differences are reflected in relatively minor structural variations between the orifice rod assembly 20 for the longitudinally moveable control rod mechanism that is shown in FIG. 3 and the stationary empty control rod guide tube configuration that is shown in FIGS. 1 and 2.

More specifically, a generally parallel first array of plates 32 through 37, inclusive, mesh and interlock with an essentially perpendicular second group of parallel plates 40 through 46. The individual plates in the arrays of the plates 33 through 37, 40 through 46 each have appropriately spaced mating slots formed in opposite plate halves, the individual slots being approximately half of the depth of the plate in which it is formed. By pressing the two mutually perpendicular groups of plates together at the respective mating slots, the entire structure is joined to form a rigid cellular grid, much in the way cardboard dividers are formed to protect the individual eggs in an egg-crate.

To further enhance the integrity and strength of orifice rod assembly 47, junctions at the mutually slotted plate intersections, of which junctions 50, 51 are typical can be welded.

Particular attention is invited to the plates 36, 37, 40, 41. As best seen in FIG. 2, the representative plate 37 is provided, near its ends with a somewhat greater depth that appears as a broad portion 52 which nests or is received on the upper surface of a recess 53 formed in the longitudinally moveable plate 23A that bears against the system of coil springs 24A. As shown in the drawing, the transverse extremity of the plate 37 has a member 55 that protrudes beyond the perimeter of the plate 23A and nests in a groove (FIG. 1) that is formed in the portion of the upper end fitting 25A (FIG. 2) which is pressed into contract with the lower bearing surface of the upper grid pad 27A.

In a similar manner, the plates 40, 41 and 36 (FIG. 1) also have protruding members 56, 57 and 54, respectively, that are locked into associated grooves in the upper end fitting 25A by means of the upper grid pad 27A or 30A. Although not shown in the illustrated portion of the drawing, the opposite transverse ends of the plates 40, 41, 36 and 37 have protruding members which also are locked to the upper end fitting 25A through the action of the upper grid pads that are immediately above the protruding members in question. The orifice rod assembly 47 is, in this fashion, prevented from engaging in any longitudinal or transverse movement. The transverse plate 23A, however, can move longitudinally through the distance that is permitted by the stops in the upper end fitting 25A and against the force of the coil springs 24A.

This rigid retention of the orifice rod assembly 47 is, of course, entirely contrary to the free longitudinal movement that the orifice rod assembly 20 in FIG. 3 transmits to the control rods 12 through 18. This feature of the invention is illustrative of the flexibility that the orifice rod assembly grid structure imparts to the problems of partially used fuel rod relocation within the reactor core.

Continuing on with the description of the embodiment of the invention that is shown in FIGS. 1 and 2, it will be recalled that this specific illustration is used with empty control rod guide tubes. To overcome the thermal inefficiency that is caused by relatively cold water flowing from the inlet to the reactor core, through the empty guide tubes and out at the reactor discharge to mix with and reduce the temperature of the heated coolant that flows from the balance of the reactor core, control rod guide tube plugs 61, 62 and 63 are provided in the orifice rod assembly 47. As best shown in FIG. 2, each of the plugs 61, 62 and 63 is a generally tubular structure that has an outside diameter which will enable each plug to fit snugly within the interior of a control rod guide tube. To block flow through the guide tube, one extreme end of each of the plugs 61, 62 and 63 is swaged on otherwise suitably closed. The opposite end of each of the respective plugs is, however, expanded in a transverse direction to provide stops 65, 66 and 67 that limit the movement in a longitudinal direction of each of the plugs.

In a manner similar to that which is described in connection with the control rods 12 through 18 (FIG. 3) "burnable poison" rods (not shown in the drawing) are mounted in a cellular grid of the type hereinbefore described. In this specific instance, however, it will be recalled that the "burnable poison" rods are not moved during reactor operation. Accordingly, to accommodate immobile "burnable poison" rods, the cellular grid structure that sustains these rods should be of the type described with respect to FIGS. 1 and 2, in which hooks or protruding members on the cellular grid or orifice rod assembly are rigidly engaged between the lower surfaces of the upper grid pads and respective grooves formed in the upper end fitting. This prevents the orifice rod assembly and the "burnable poison" rods from moving relative to the respective fuel element.

In operation, as the need arises to reposition a partially used fuel element within a reactor core in order to obtain the maximum efficient use of the nuclear fuel within the fuel element, the fuel element is removed from the reactor core in a suitably shielded manner. The orifice rod assembly is changed, as appropriate, to provide control rod, empty control rod guide tube plugs or "burnable poison" rod functions as the new relative position of the partially used fuel element within the core dictates. In this way, the repositioned fuel element enjoys an optimum location within the core without imposing a need to remotely disassemble and rebuild the fuel element to satisfy special fitting requirements, the critical point being the longitudinal alignment between the cells and the associated control rod guide tubes, regardless of the particular use of the orifice rod assembly for control, "burnable poison" or guide tube plug application.

The embodiments of the invention in which an exclusive property of privilege is claimed are defined as follows:

1. A fuel element comprising a plurality of generally parallel fuel rods, each of said rods having transverse ends, a plurality of hollow control rod guide tubes interspersed within and generally parallel with said fuel rods, an end fitting disposed in a direction that is generally transverse to said fuel rods and guide tubes, said end fitting having a plurality of grooves formed therein, a first array of parallel, spaced plates on said end fitting, at least some of said plates having members formed thereon that are received in respective grooves, a second array of parallel, spaced plates on said end fitting, generally perpendicular to and interlocking with said first array to form a plurality of cells, at least some of said second array plates having members formed thereon that are received in respective grooves, and said cells being in longitudinal alignment with said hollow control rod guide tubes and said fuel rods to provide direct access to at least one of said ends of each of said fuel rods in order to expose said rod ends for inspection purposes to determine the structural integrity of each of the inspected rods.

2. A fuel element according to claim 1 further comprising "burnable poison" rods, the ends thereof being engaged in respective cells and the balance of said "burnable poison" rods being received in said respective guide tubes.

3. A fuel element according to claim 1 further comprising a plurality of sealed plugs, the ends thereof being engaged in respective cells and the balance of each of said plugs being received in said respective guide tubes.

* * * * *